(12) United States Patent
Spangler et al.

(10) Patent No.: US 10,273,808 B2
(45) Date of Patent: Apr. 30, 2019

(54) LOW LOSS AIRFLOW PORT

(71) Applicant: United Technologies Corporation, Farmington, CT (US)

(72) Inventors: Brandon W. Spangler, Vernon, CT (US); Dominic J. Mongillo, West Hartford, CT (US); Edward F. Pietraszkiewicz, Southington, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 718 days.

(21) Appl. No.: 14/938,310

(22) Filed: Nov. 11, 2015

(65) Prior Publication Data
US 2017/0130590 A1 May 11, 2017

(51) Int. Cl.
*F01D 5/18* (2006.01)
*F01D 9/02* (2006.01)
*F01D 25/12* (2006.01)

(52) U.S. Cl.
CPC ............ *F01D 5/18* (2013.01); *F01D 5/187* (2013.01); *F01D 9/02* (2013.01); *F01D 25/12* (2013.01); *F05D 2220/32* (2013.01); *F05D 2230/12* (2013.01); *F05D 2260/201* (2013.01); *F05D 2260/60* (2013.01)

(58) Field of Classification Search
CPC ............ F01D 5/18; F01D 9/02; F01D 25/12
See application file for complete search history.

(56) References Cited

U.S. PATENT DOCUMENTS 7,866,948 B1   1/2011 Liang
8,408,866 B2 * 4/2013 Weaver et al. ......... F01D 5/082
                                                        415/1

FOREIGN PATENT DOCUMENTS

EP    1772592     9/2006
EP    2423435     2/2012
GB    2262314     6/1993
WO    2015057310  4/2015

OTHER PUBLICATIONS

European Search Report, European Application No. 16198410.9, dated Mar. 8, 2017, European Patent Office; European Search Report 10 pages.

* cited by examiner

*Primary Examiner* — Kevin Lee
(74) *Attorney, Agent, or Firm* — Cantor Colburn LLP

(57) ABSTRACT

An airfoil of a gas turbine engine is provided. The airfoil includes an airfoil body having at least one internal flow passage, the body having a first surface and a second surface, the first surface defining a wall of the at least one internal flow passage and a bleed port fluidly connecting the at least one internal flow passage to the second surface. The bleed port includes a bleed orifice extending from the second surface toward the internal flow passage and a bleed port cavity extending from the first surface toward the second surface, the bleed port cavity and the bleed orifice fluidly connected. The bleed port cavity is defined by a bleed port cavity wall and a base wall surrounding the bleed orifice. The bleed port cavity wall extends from the first surface to the base wall.

19 Claims, 9 Drawing Sheets

LOW LOSS AIRFLOW PORT

BACKGROUND

The subject matter disclosed herein generally relates to airflow ports in components of gas turbine engines and, more particularly, to low loss airflow ports in components of gas turbine engines.

Airfoils, and particularly airfoils of gas turbine engines, may include internal flow passages to enable cooling of the airfoils. At various points on the airfoil, air may be bled from the internal flow passages. Bleeding flow from the internal flow passage may result in high pressure loss as the flow gets onboard the bleed orifice, especially for high bleed angles such as 90 degree bleeds.

SUMMARY

According to one embodiment, an airfoil of a gas turbine engine is provided. The airfoil includes an airfoil body having at least one internal flow passage, the body having a first surface and a second surface, the first surface defining a wall of the at least one internal flow passage and a bleed port fluidly connecting the at least one internal flow passage to the second surface. The bleed port includes a bleed orifice extending from the second surface toward the internal flow passage and a bleed port cavity extending from the first surface toward the second surface, the bleed port cavity and the bleed orifice fluidly connected. The bleed port cavity is defined by a bleed port cavity wall and a base wall surrounding the bleed orifice. The bleed port cavity wall extends from the first surface to the base wall.

In addition to one or more of the features described above, or as an alternative, further embodiments of the airfoil may include that the second surface is one of a surface of a second internal flow passage and a surface external to the airfoil.

In addition to one or more of the features described above, or as an alternative, further embodiments of the airfoil may include a second bleed orifice extending from the second surface to the base wall of the bleed port cavity.

In addition to one or more of the features described above, or as an alternative, further embodiments of the airfoil may include that the bleed port is a first bleed port, the airfoil further comprising a second bleed port.

In addition to one or more of the features described above, or as an alternative, further embodiments of the airfoil may include that the second bleed port includes a second bleed orifice extending from the second surface toward the internal flow passage at a location different from the first bleed port and a second bleed port cavity extending from the first surface toward the second surface, the second bleed port cavity and the second bleed orifice fluidly connected. The second bleed port cavity is defined by a second bleed port cavity wall and a second base wall surrounding the second bleed orifice. The second bleed port cavity wall extends from the first surface to the second base wall.

In addition to one or more of the features described above, or as an alternative, further embodiments of the airfoil may include that the bleed port cavity wall comprises an upstream cavity wall located upstream of the bleed orifice in an airflow direction within the internal flow passage, the upstream cavity wall angled at a shallow entrance angle in the airflow direction and a downstream cavity wall located downstream of the bleed orifice in the airflow direction, the downstream cavity wall oriented to be skew with respect to a direction of the bleed orifice.

In addition to one or more of the features described above, or as an alternative, further embodiments of the airfoil may include that the downstream cavity wall extends in a direction substantially similar to the angle of the upstream cavity wall.

In addition to one or more of the features described above, or as an alternative, further embodiments of the airfoil may include that the downstream cavity wall extends in a direction substantially opposite to the angle of the upstream cavity wall.

In addition to one or more of the features described above, or as an alternative, further embodiments of the airfoil may include that the bleed port cavity wall forms a curved surface extending from the first surface of the airfoil to the base wall.

In addition to one or more of the features described above, or as an alternative, further embodiments of the airfoil may include that the bleed port cavity wall forms a multi-faceted geometry.

In addition to one or more of the features described above, or as an alternative, further embodiments of the airfoil may include that the airfoil is one of a vane, a blade, or a blade outer air seal of a gas turbine engine.

According to another embodiment, a method of manufacturing an airfoil of a gas turbine engine is provided. The method includes forming an airfoil body having at least one internal flow passage, the body having a first surface and a second surface, the first surface defining a wall of the at least one internal flow passage and forming a bleed port in the airfoil body, the bleed port fluidly connecting the at least one internal flow passage to the second surface. The bleed port includes a bleed orifice extending from the second surface toward the internal flow passage and a bleed port cavity extending from the first surface toward the second surface, the bleed port cavity and the bleed orifice fluidly connected. The bleed port cavity is defined by a bleed port cavity wall and a base wall surrounding the bleed orifice. The bleed port cavity wall extends from the first surface to the base wall.

In addition to one or more of the features described above, or as an alternative, further embodiments of the method may include that the bleed port is formed between two separate airflow passages within the airfoil.

In addition to one or more of the features described above, or as an alternative, further embodiments of the method may include that the bleed port is formed between the internal flow passage and an exterior surface of the airfoil.

In addition to one or more of the features described above, or as an alternative, further embodiments of the method may include forming a second bleed orifice extending from the second surface to the base wall of the bleed port cavity.

In addition to one or more of the features described above, or as an alternative, further embodiments of the method may include that the bleed port is a first bleed port, the method further comprising forming a second bleed port in the airfoil.

In addition to one or more of the features described above, or as an alternative, further embodiments of the method may include that the second bleed port includes a second bleed orifice extending from the second surface toward the internal flow passage at a location different from the first bleed port and a second bleed port cavity extending from the first surface toward the second surface, the second bleed port cavity and the second bleed orifice fluidly connected. The second bleed port cavity is defined by a second bleed port cavity wall and a second base wall surrounding the second bleed orifice. The second bleed port cavity wall extends from the first surface to the second base wall.

In addition to one or more of the features described above, or as an alternative, further embodiments of the method may include that the internal airflow passage and the bleed port cavity are formed simultaneously.

In addition to one or more of the features described above, or as an alternative, further embodiments of the method may include that the bleed orifice is formed by electrical discharge machining.

In addition to one or more of the features described above, or as an alternative, further embodiments of the method may include that the bleed orifice is formed by an additive manufacturing process to produce a desired bleed port geometry either by fabrication of a ceramic and/or refractory metal core or by direct fabrication using a powder metal material.

According to another embodiment, a gas turbine engine is provided. The gas turbine engine includes an airfoil having an airfoil body having at least one internal flow passage, the body having a first surface and a second surface, the first surface defining a wall of the at least one internal flow passage and a bleed port fluidly connecting the at least one internal flow passage to the second surface. The bleed port includes a bleed orifice extending from the second surface toward the internal flow passage and a bleed port cavity extending from the first surface toward the second surface, the bleed port cavity and the bleed orifice fluidly connected. The bleed port cavity is defined by a bleed port cavity wall and a base wall surrounding the bleed orifice. The bleed port cavity wall extends from the first surface to the base wall.

Technical effects of embodiments of the present disclosure include airfoils having airflow ports, e.g., bleed ports, having a bleed port cavity that enables shorter bleed orifices and/or enables improved airflow, cooling, and/or minimized stresses within the airfoil around the bleed port.

The foregoing features and elements may be executed or utilized in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter is particularly pointed out and distinctly claimed at the conclusion of the specification. The foregoing and other features, and advantages of the present disclosure are apparent from the following detailed description taken in conjunction with the accompanying drawings in which:

DETAILED DESCRIPTION

Figure 1A:
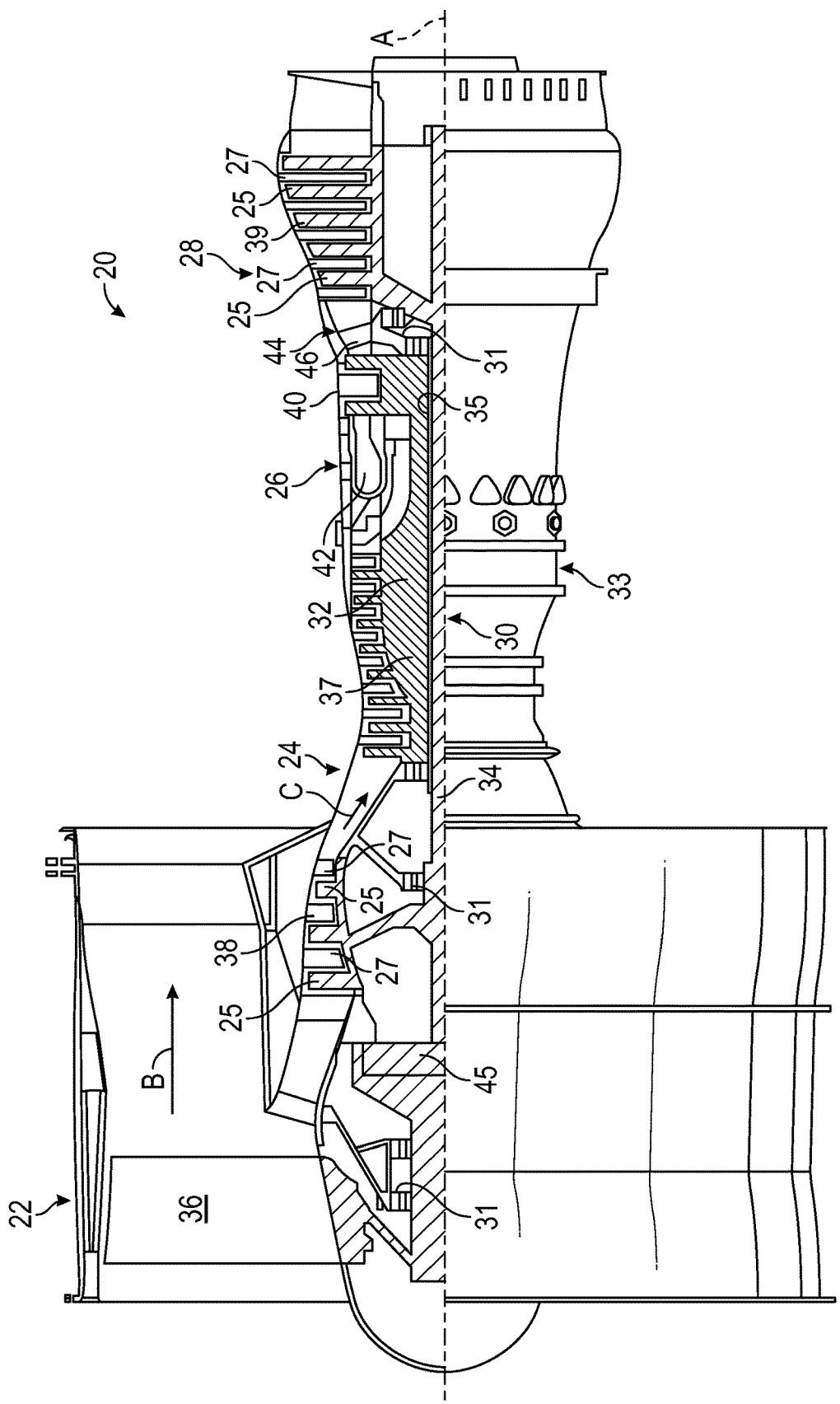
FIG. 1A is a schematic cross-sectional illustration of a gas turbine engine that may employ various embodiments disclosed herein.

As shown and described herein, various features of the disclosure will be presented. Various embodiments may have the same or similar features and thus the same or similar features may be labeled with the same reference numeral, but preceded by a different first number indicating the Figure Number to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

FIG. 1A schematically illustrates a gas turbine engine 20. The exemplary gas turbine engine 20 is a two-spool turbofan engine that generally incorporates a fan section 22, a compressor section 24, a combustor section 26, and a turbine section 28. Alternative engines might include an augmenter section (not shown) among other systems for features. The fan section 22 drives air along a bypass flow path B, while the compressor section 24 drives air along a core flow path C for compression and communication into the combustor section 26. Hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of engines, including but not limited to, three-spool engine architectures.

The gas turbine engine 20 generally includes a low speed spool 30 and a high speed spool 32 mounted for rotation about an engine centerline longitudinal axis A. The low speed spool 30 and the high speed spool 32 may be mounted relative to an engine static structure 33 via several bearing systems 31. It should be understood that other bearing systems 31 may alternatively or additionally be provided.

The low speed spool 30 generally includes an inner shaft 34 that interconnects a fan 36, a low pressure compressor 38 and a low pressure turbine 39. The inner shaft 34 can be connected to the fan 36 through a geared architecture 45 to drive the fan 36 at a lower speed than the low speed spool 30. The high speed spool 32 includes an outer shaft 35 that interconnects a high pressure compressor 37 and a high pressure turbine 40. In this embodiment, the inner shaft 34 and the outer shaft 35 are supported at various axial locations by bearing systems 31 positioned within the engine static structure 33.

A combustor 42 is arranged between the high pressure compressor 37 and the high pressure turbine 40. A mid-turbine frame 44 may be arranged generally between the high pressure turbine 40 and the low pressure turbine 39. The mid-turbine frame 44 can support one or more bearing systems 31 of the turbine section 28. The mid-turbine frame 44 may include one or more airfoils 46 that extend within the core flow path C.

The inner shaft 34 and the outer shaft 35 are concentric and rotate via the bearing systems 31 about the engine centerline longitudinal axis A, which is co-linear with their longitudinal axes. The core airflow is compressed by the low pressure compressor 38 and the high pressure compressor 37, is mixed with fuel and burned in the combustor 42, and is then expanded over the high pressure turbine 40 and the low pressure turbine 39. The high pressure turbine 40 and the low pressure turbine 39 rotationally drive the respective high speed spool 32 and the low speed spool 30 in response to the expansion.

The pressure ratio of the low pressure turbine 39 can be pressure measured prior to the inlet of the low pressure turbine 39 as related to the pressure at the outlet of the low pressure turbine 39 and prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 38, and the low pressure turbine 39 has a pressure ratio that is greater than about five (5:1). It should be understood, however, that the above parameters are only examples of one embodiment of a geared architecture engine and that the present disclosure is applicable to other gas turbine engines, including direct drive turbofans.

In this embodiment of the example gas turbine engine 20, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of $[(Tram° R)/(518.7° R)]0.5$, where T represents the ambient temperature in degrees Rankine. The Low Corrected Fan Tip Speed according to one non-limiting embodiment of the example gas turbine engine 20 is less than about 1150 fps (351 m/s).

Each of the compressor section 24 and the turbine section 28 may include alternating rows of rotor assemblies and vane assemblies (shown schematically) that carry airfoils that extend into the core flow path C. For example, the rotor assemblies can carry a plurality of rotating blades 25, while each vane assembly can carry a plurality of vanes 27 that extend into the core flow path C. The blades 25 of the rotor assemblies create or extract energy (in the form of pressure) from the core airflow that is communicated through the gas turbine engine 20 along the core flow path C. The vanes 27 of the vane assemblies direct the core airflow to the blades 25 to either add or extract energy.

Various components of a gas turbine engine 20, including but not limited to the airfoils of the blades 25 and the vanes 27 of the compressor section 24 and the turbine section 28, may be subjected to repetitive thermal cycling under widely ranging temperatures and pressures. The hardware of the turbine section 28 is particularly subjected to relatively extreme operating conditions. Therefore, some components may require internal cooling circuits for cooling the parts during engine operation. Example cooling circuits that include features such as airflow bleed ports are discussed below.

Figure 1B:
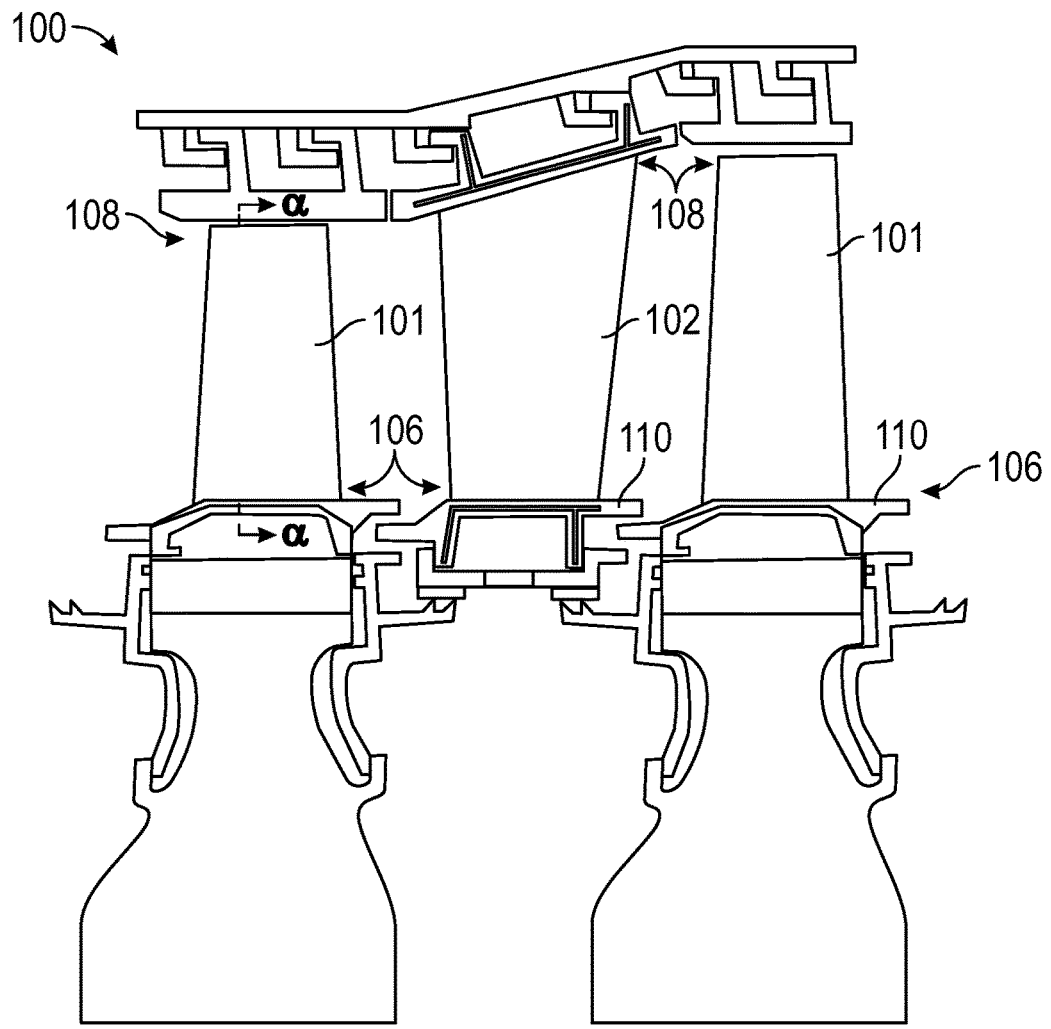
FIG. 1B is a schematic illustration of a turbine that may employ various embodiments disclosed herein.

FIG. 1B is a schematic view of a turbine section that may employ various embodiments disclosed herein. Turbine 100 includes a plurality of airfoils, including, for example, one or more blades 101 and vanes 102. The airfoils 101, 102 may be hollow bodies with internal cavities defining a number of channels or cavities, hereinafter airfoil cavities, formed therein and extending from an inner diameter 106 to an outer diameter 108, or vice-versa. The airfoil cavities may be separated by partitions within the airfoils 101, 102 that may extend either from the inner diameter 106 or the outer diameter 108 of the airfoil 101, 102. The partitions may extend for a portion of the length of the airfoil 101, 102, but may stop or end prior to forming a complete wall within the airfoil 101, 102. Thus, each of the airfoil cavities may be fluidly connected and form a fluid path within the respective airfoil 101, 102. The blades 101 and the vanes may include platforms 110 located proximal to the inner diameter thereof. Located below the platforms 110 may be airflow ports and/or bleed orifices that enable air to bleed from the internal cavities of the airfoils 101, 102.

Although an aero or aircraft engine application is shown and described above, those of skill in the art will appreciate that airfoil configurations as described herein may be applied to industrial applications and/or industrial gas turbine engines, land based or otherwise.

Figure 2A:
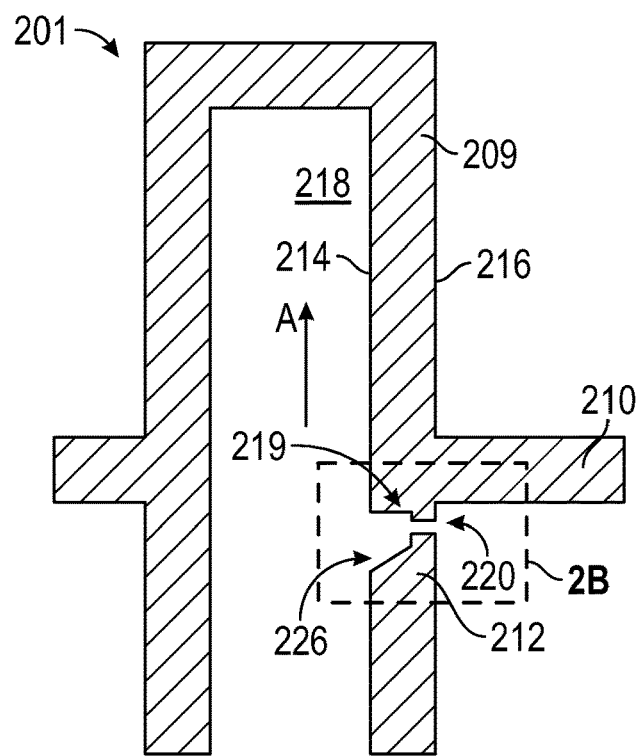
FIG. 2A is a cross-sectional schematic illustration of an airfoil in accordance with an embodiment of the present disclosure viewed along the line α-α of FIG. 1B.
Figure 2B:
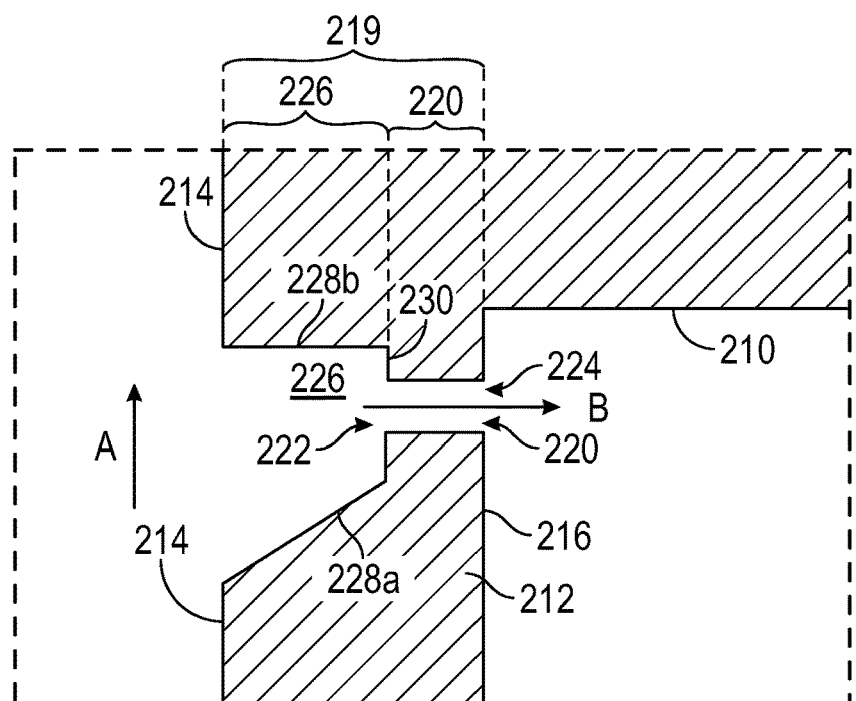
FIG. 2B is an enlarged illustration of a bleed port in the airfoil of FIG. 2A.

Turning now to FIGS. 2A and 2B, views of a low loss airflow port in an airfoil in accordance with a non-limiting embodiment of the present invention are shown. FIG. 2A is a cross-sectional view of an airflow passage within an airfoil, such as a blade, having an airflow port, herein after "bleed port," 219 in accordance with an embodiment of the present disclosure. FIG. 2A is a view of a non-limiting embodiment described herein viewed along the line α-α of FIG. 1B. FIG. 2B is an enlarged view of the bleed port of FIG. 2A. Those of skill in the art will appreciate that airflow passages as described herein may be applied to any type of airfoil or other component, such as blade outer air seals, etc.

As shown, an airfoil 201, such as a turbine blade in a gas turbine engine, may include an airfoil body 209, having a blade neck transition wall 212, the body 209 having a first surface 214 and a second surface 216. A platform 210 extends from the second surface 216 of the airfoil body 209. The first surface 214 of the airfoil body 209 may define a cooling passage 218 therein. As such, the first surface 214, in some embodiments, may be an interior surface and the second surface 216 may be an exterior surface of the airfoil 201.

Air within the cooling passage 218 may bleed from the cooling passage 218 through a bleed port 219, that may include a bleed orifice 220 and bleed port cavity 226 as described herein, that fluidly connects the cooling passage 218 with an exterior area of the airfoil 201. As shown, the bleed port 219 may pass through a portion of the airfoil body 209, such as a blade neck transition wall 212, and air may flow from an inlet side 222 to an outlet side 224 of the bleed orifice 220, and in some embodiments, the bleed orifice 220 may be oriented perpendicular to an airflow direction A within the cooling passage 218. Thus, the bleed air may pass in a bleed flow direction B, as shown. The bleed orifice 220, as shown, may be configured to provide air pressure and cooling airflow below the blade airfoil platform 210. The bleed orifice 220 may have a cylindrical, elliptical, teardrop, conical, or other geometry, and in some embodiments may have a constant diameter from the inlet side 222 to the outlet side 224.

The inlet side 222 of the bleed orifice 220 may fluidly connect with the bleed port cavity 226. The bleed port cavity 226 may be defined by bleed port cavity walls 228. As used herein, reference 228 will refer to the bleed port cavity walls and a first or upstream bleed port wall will be referred to as 228a and a second or downstream bleed port wall will be referred to as 228b. The bleed port cavity walls 228 may be configured to reduce the local velocity of the airflow, and reduce a local pressure dynamic head immediately upstream of the bleed orifice 220, and/or direct the air to turn before the air enters the bleed orifice 220. As shown, the first bleed port wall 228a may have a shallow entrance angle in an airflow direction (e.g., along direction A). The first bleed port wall 228a may be upstream of the bleed orifice 220. This serves to increase an upstream pressure feeding the bleed orifice 220 thereby reducing the total pressure loss getting onboard the bleed orifice 220. The second bleed port cavity wall 228b may be parallel with respect to a direction of the bleed orifice 220 and perpendicular to airflow within the cooling passage 218, improving total pressure recovery by causing the bleed flow to be "captured" and directed into the bleed orifice 220. The second bleed port cavity wall 228b may be downstream relative to the bleed orifice 220. The bleed port cavity 226 may also include a base wall 230 that runs parallel to the first and second surfaces 214, 216 of the airfoil body 209 and the blade neck transition wall 212 and, in some embodiments, may form a perpendicular surface around an axis of the bleed orifice 220 within the bleed port 219.

As configured, the first bleed port wall 228a may enable cooling air to be more directly oriented, enabling a component of total pressure to serve as the driving pressure when entering the bleed orifice 220 from the cooling passage 218. This may result in feed pressure between total and static pressure as well as reduced pressure loss getting onboard the bleed orifice 220. Moreover, the downstream or second bleed port wall 228b may be designed to serve as a total pressure recovery device or surface and act as a scoop or flow diverter such that a portion of the locally higher total pressure in the cooling passage 218 serves as a driving pressure upstream of the bleed orifice 220. Furthermore, because of the bleed port cavity 226 is formed in the first surface 214 of the airfoil body 209 such as blade neck transition wall 212, the length of the bleed orifice 220 may be shortened, resulting in less friction loss as the bleed air passing from the inlet side 222 to the outlet side 224 of the bleed orifice 220.

Figure 3A:
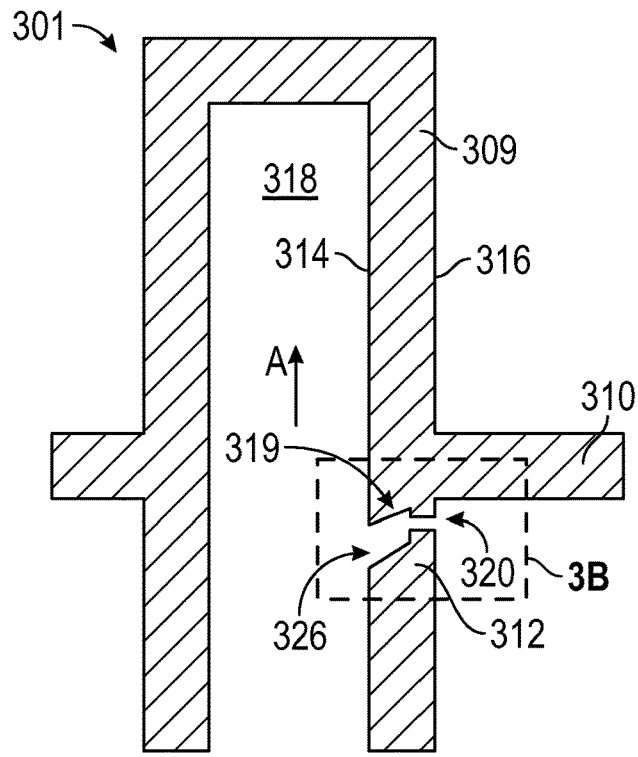
FIG. 3A is a cross-sectional schematic illustration of an airfoil in accordance with another embodiment of the present disclosure viewed along the line α-α of FIG. 1B.
Figure 3B:
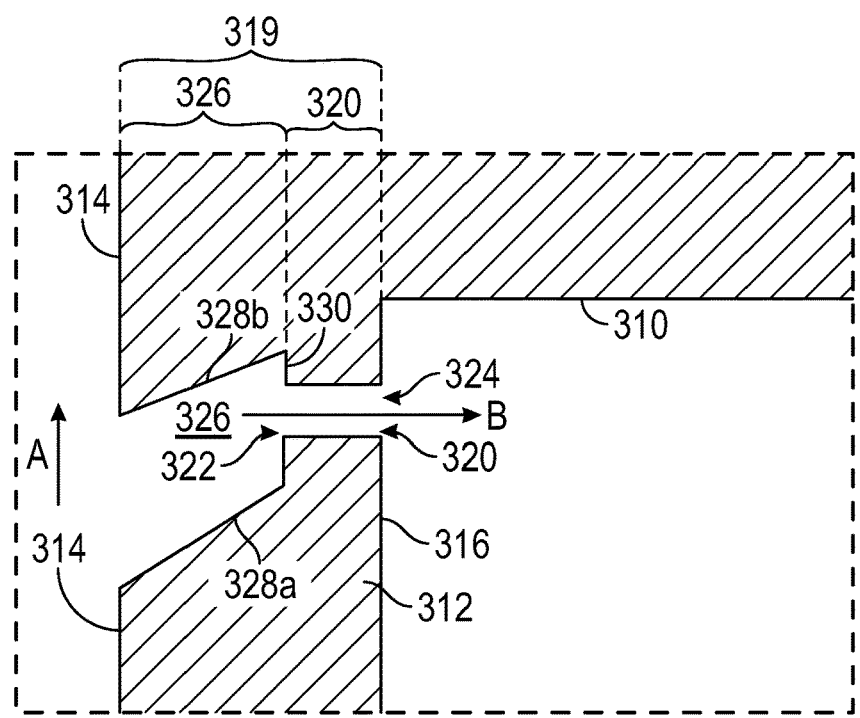
FIG. 3B is an enlarged illustration of a bleed port in the airfoil of FIG. 3A.

Turning now to FIGS. 3A and 3B, another example of a bleed port 319 in accordance with a non-limiting embodiment of the present disclosure is shown. FIG. 3A is a cross-sectional view of an airflow passage within an airfoil, such as a blade, having a bleed port 319 in accordance with an embodiment of the present disclosure. FIG. 3A is a view of a non-limiting embodiment described herein viewed along the line α-α of FIG. 1B. FIG. 3B is an enlarged view of the configured of the bleed port 319 of FIG. 3A.

As shown, an airfoil 301, such as a turbine blade in a gas turbine engine, may include an airfoil body 309 having a blade neck transition wall 312 and a first surface 314 of the airfoil body 309. The first surface 314 may define a cooling passage 318 therein. A platform 310 extends from a second surface 316 of the airfoil body 309 at the blade neck transition wall 312.

Air within the cooling passage 318 may bleed from the cooling passage 318 through the bleed port 319, that may include a bleed orifice 320 and bleed port cavity 326 as described herein, that fluidly connects the cooling passage 318 with an exterior area of the airfoil 301. As shown, the bleed port 319 may pass through a portion of the airfoil body 309, such as the blade neck transition wall 312, and air may flow from an inlet side 322 to an outlet side 324 of the bleed orifice 320, and in some embodiments, the bleed orifice 220 may be oriented perpendicular to an airflow direction A within the cooling passage 318. Thus, the bleed air may pass in a bleed flow direction B, as shown. The bleed orifice 320, as shown, may be configured to provide air pressure and cooling airflow below the platform 310. The bleed orifice 320 may have a cylindrical, elliptical, teardrop, conical, or other geometry, and in some embodiments may have a constant diameter from the inlet side 322 to the outlet side 324.

The inlet side 322 of the bleed orifice 320 may fluidly connect with the bleed port cavity 326. The bleed port cavity 326 may be defined by bleed port cavity walls 328a and 328b. The bleed port cavity walls 328a, 328b may be configured to reduce the local velocity of the airflow, and reduce the local pressure dynamic head immediately upstream of the bleed orifice 320, and/or direct the air to turn before the air enters the bleed orifice 320. As shown, a first bleed port wall 328a may have a shallow entrance angle in a streamwise airflow direction (e.g., along direction A). The first bleed port wall 328a may be upstream of the bleed orifice 320. The orientation of the first bleed port wall 328a is such that a portion of the locally higher total pressure in the cooling passage 318 serves as the driving pressure upstream of the bleed orifice 320 by reducing local flow separation and the pressure loss getting onboard the bleed orifice 320.

A second bleed port cavity wall 328b may be oriented to be skewed with respect to a direction of the bleed orifice 320 (e.g., direction B). The design of the bleed port cavity wall 328b can be designed to serve as a total pressure recovery device or surface and act as a scoop or flow diverter such that a portion of the locally higher total pressure in the cooling passage 318 would serve as the driving pressure upstream of the bleed orifice 320. The second bleed port cavity wall 328b may be downstream relative to the bleed orifice 320. The bleed port cavity 326 may also include a base wall 330 that runs parallel to the first and second surfaces 314, 316 of the airfoil body 309 and in some embodiments may form a perpendicular surface around the bleed orifice 320 within the bleed port 319. As shown, the skewed second bleed port wall 328b may be angled such that the surface of the second bleed port wall 328b extends in a direction substantially similar to the first bleed port wall 328a.

Figure 4A:
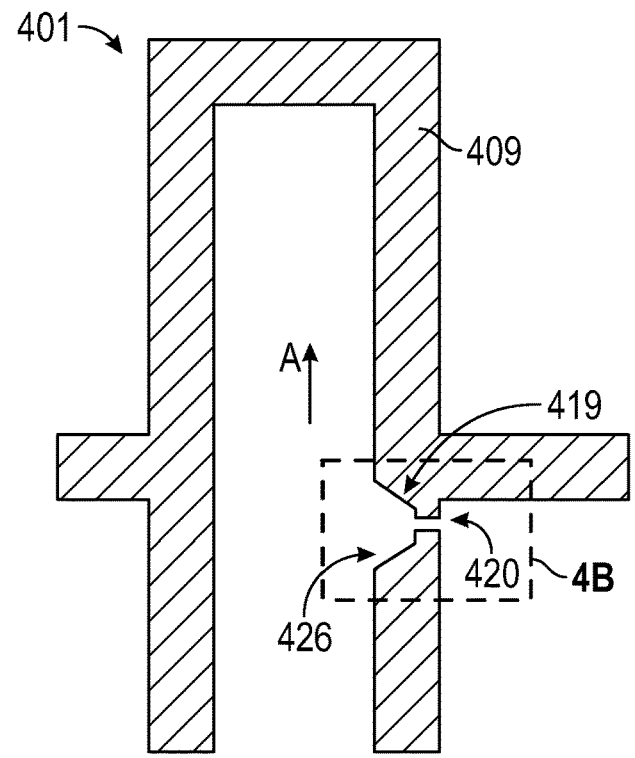
FIG. 4A is a cross-sectional schematic illustration of an airfoil in accordance with another embodiment of the present disclosure viewed along the line α-α of FIG. 1B.
Figure 4B:
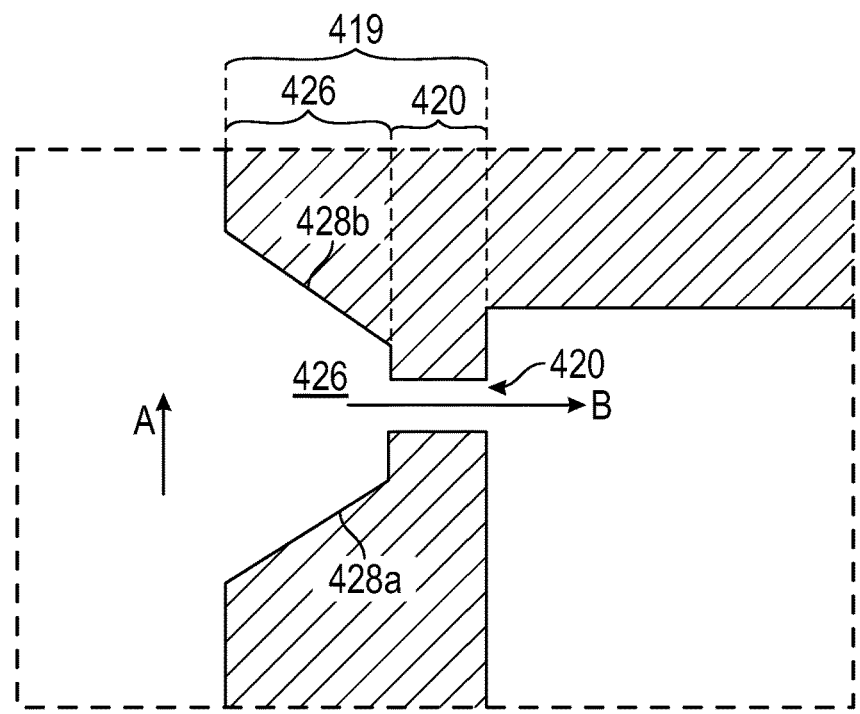
FIG. 4B is an enlarged illustration of a bleed port in the airfoil of FIG. 4A.

Turning now to FIGS. 4A and 4B, another alternative non-limiting embodiment in accordance with the present disclosure is shown. In the embodiment shown FIGS. 4A and 4B, an airfoil 401 is configured substantially similar to that described above, and thus similar features will not be described herein for simplicity. FIG. 4A is a view of a non-limiting embodiment described herein viewed along the line α-α of FIG. 1B. The airfoil 401 includes a bleed port 419, and particularly bleed port cavity 426, with a configuration different than that described above.

As shown, the bleed port 419 includes a first bleed port cavity wall 428a that is similar to that described above, i.e., having a shallow entrance angle in an airflow direction (e.g., along direction A). In the embodiment of FIGS. 4A and 4B, the second bleed port cavity wall 428b, i.e., downstream with respect to a bleed orifice 420, is skewed at an angle relative to a direction of the bleed orifice 420 (direction B). In this embodiment, the skewed second bleed port wall 428b may be angled such that the surface of the second bleed port wall 428b extends in a direction substantially opposite to the angle of the first bleed port wall 428a. Such configuration may reduce the stress around the bleed port 419 caused by a rotational pull of airfoil body 409.

As can be seen from the example embodiments shown and described above, the bleed port cavity of the bleed port may take various configurations. Referring now to FIGS. 5A-5F, various alternative examples of the geometry of the bleed port cavity and the walls thereof are shown. In each of the embodiments, the narrow end of the bleed port cavity is connected to a base wall and a bleed orifice and the wider end of the bleed port cavity formed within a first surface of an airfoil body, similar to that shown and described above.

Figure 5A:
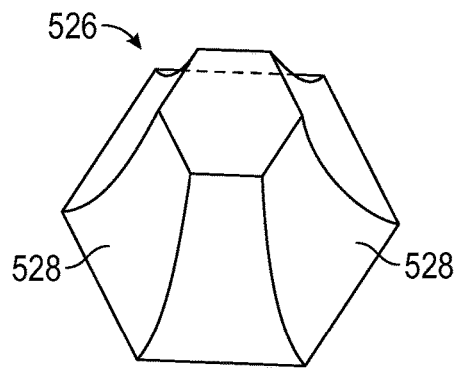
FIG. 5A is a schematic illustration a geometry for a bleed port cavity in accordance with an embodiment of the present disclosure.
Figure 5B:
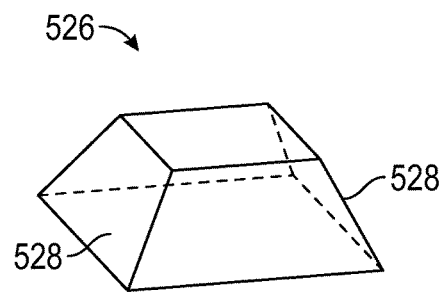
FIG. 5B is a schematic illustration a geometry for a bleed port cavity in accordance with an embodiment of the present disclosure.
Figure 5C:
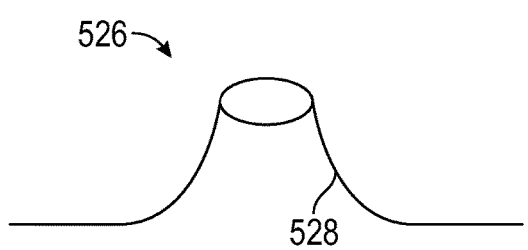
FIG. 5C is a schematic illustration a geometry for a bleed port cavity in accordance with an embodiment of the present disclosure.

As shown, in FIG. 5A, the walls 528 of the bleed port cavity 526 may be multi-faceted and curved. In FIG. 5B, the walls 528 of the bleed port cavity 526 may be flat, and, as shown, the bleed port cavity 526 may have a four-sided facet configuration. In FIG. 5C, the walls 528 of the bleed port cavity 526 may be flat, with curved or radiused transitions between the walls 528 of the bleed port cavity 526 and a first surface of an airfoil body, a base wall of the bleed port, and/or a bleed orifice of the bleed port.

Figure 5D:
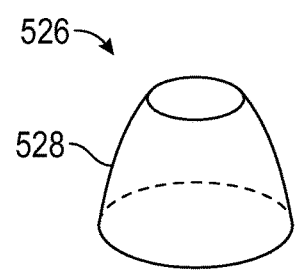
FIG. 5D is a schematic illustration a geometry for a bleed port cavity in accordance with an embodiment of the present disclosure.
Figure 5E:
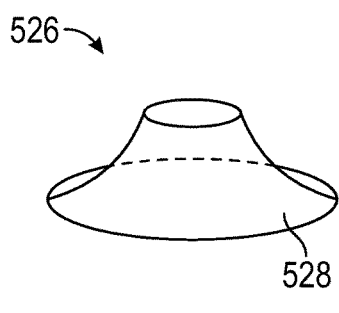
FIG. 5E is a schematic illustration a geometry for a bleed port cavity in accordance with an embodiment of the present disclosure.
Figure 5F:
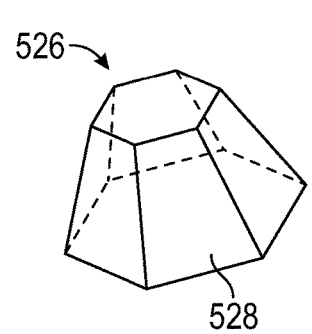
FIG. 5F is a schematic illustration a geometry for a bleed port cavity in accordance with an embodiment of the present disclosure.

FIG. 5D shows a bleed port cavity 526 having walls 528 that are convex. FIG. 5E shows a bleed port cavity 526 having walls 528 that are concave. FIG. 5F shows a bleed port cavity 526 having a multi-faceted, planar configuration of the walls 528.

Although shown herein with a limited number of configurations, those of skill in the art will appreciate that the walls of the bleed port cavities may take any shape, geometry, and/or configuration. For example, the length of the bleed port cavities, i.e., depth within the first surface of the airfoil body, may be varied, further, the walls may be curved, flat, or combinations thereof. For example, in some embodiments, an upstream wall or walls may be curved and a downstream wall or walls may be flat, or the opposite may be used. Further, various diameters of the wide end of the bleed port cavity may be varied. Moreover, based on the size of the narrow end of the bleed port cavity, one or more bleed orifices may be formed in a base wall of the bleed port. As such, several discrete features may be aligned radially or axially (depending on the cavity wall configuration) with respect to an axis extending through the bleed orifice.

Further, any of the geometries shown in FIGS. 5A-5F, or other geometries, may be elongated or stretched to allow for multiple bleed orifices located at the narrow end of the bleed port cavity. The geometries of the bleed port cavity, extending along an axial streamwise length thereof, may be cylindrical, oblong, teardrop, elliptical, etc. Further, variable radii and/or curvatures may be used in the geometry of the walls of the bleed port cavity. Moreover, as noted, the transitions between the walls of the bleed port cavity and adjoining surfaces may be angled, curved, filleted, etc. As will be appreciated by those of skill in the art, multiple bleed port cavities may be formed in a first surface of an airfoil, and various configurations of single and/or multi-orifice cavities may be formed. Further, as will be appreciated by those of skill in the art, the bleed port cavity geometry, shape, size, dimensions, and configuration may be tailored depending on flow, pressure, and structural requirements.

In accordance with various embodiments, some or all bleed port cavities and bleed port orifices may be configured with rounded, blended, and/or filleted features to minimize potential internal flow separation in order to reduce total pressure losses. Further, the geometries of various transitions and/or configurations may be filleted in order to minimize local concentrated stress concerns which could adversely impact structural crack initiation and crack propagation capability. As such, in accordance with various embodiments, fillet geometries may be incorporated where possible in the formation and configuration of the bleed ports described herein. Fillet geometries can be formed using conventional core die and tooling approaches. Additionally, additive manufacturing processes can also be utilized to produce desired bleed port geometries either by fabrication of a ceramic and/or refractory metal core or by direct fabrication using a powder metal material.

Figure 6:
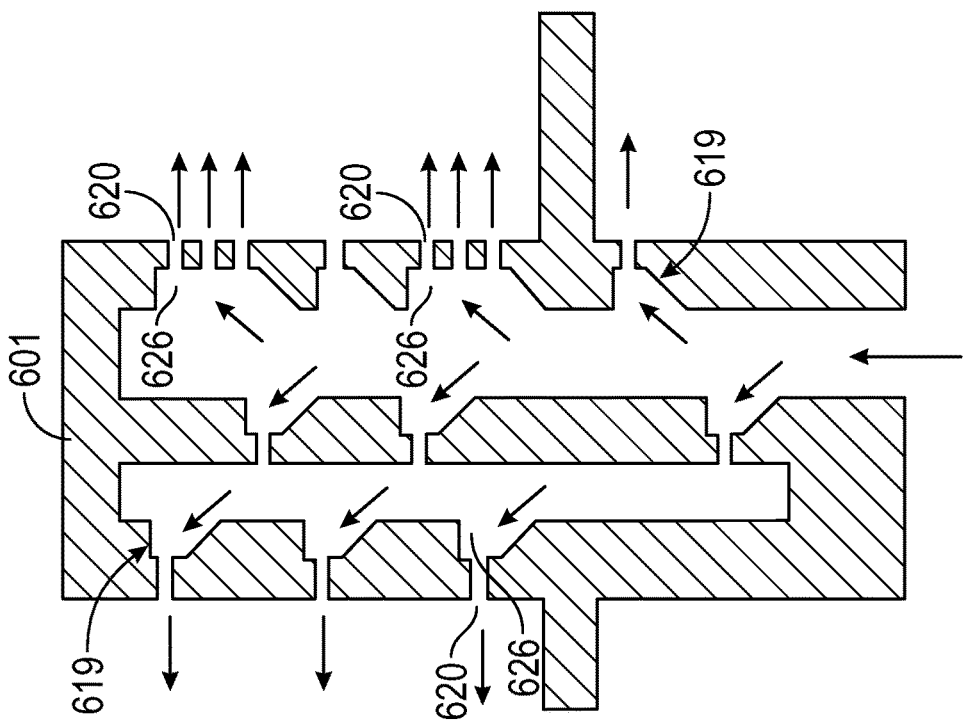
FIG. 6 is a cross-section illustration of a blade of a gas turbine engine in accordance with another embodiment of the present disclosure viewed along the line α-α of FIG. 1B.

Turning now to FIG. 6, a cross-sectional view of a blade 601 of a gas turbine engine in accordance with a non-limiting embodiment of the present disclosure is shown. FIG. 6 is a view of a non-limiting embodiment described herein viewed along the line α-α of FIG. 1B. The blade 601 may be configured with multiple bleed ports 619, with some having bleed port cavities 626 configured to have multiple bleed orifices 620 formed in the base walls thereof, and other bleed port cavities 626 having only a single bleed orifice 620 formed in a base wall thereof. Further, as shown, some of the bleed ports (having bleed port cavities and bleed orifices) may fluidly connect various internal airflow passages of the blade 601.

Figure 7:
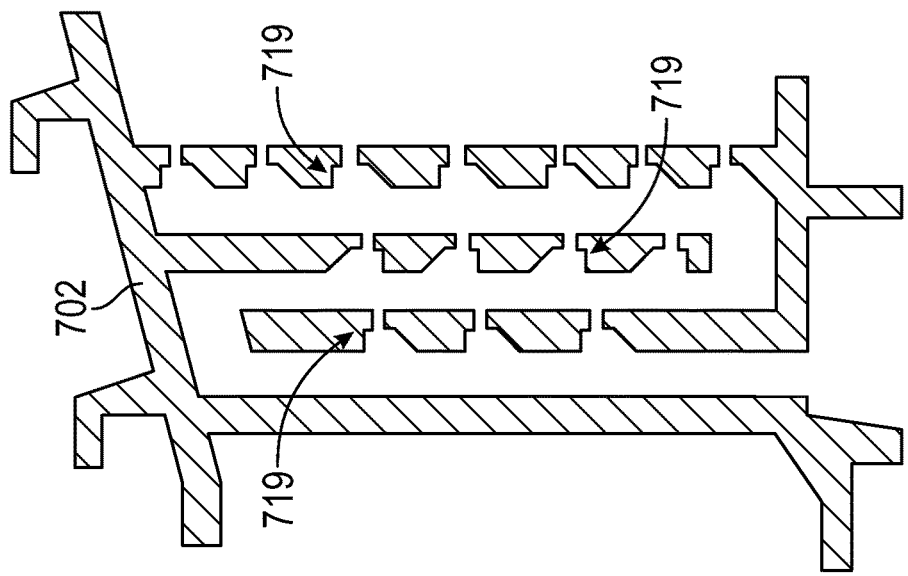
FIG. 7 is a cross-section illustration of a vane of a gas turbine engine in accordance with an embodiment of the present disclosure.

FIG. 7 shows a cross-sectional view of a vane 702 of a gas turbine engine in accordance with a non-limiting embodiment of the present disclosure. Similar to the embodiment of FIG. 6, the vane 702 is configured with a plurality of bleed ports 719, with some fluidly connecting internal airflow passages and others fluidly connecting the interior airflow passages with an area external to the vane 702.

Figure 8A:
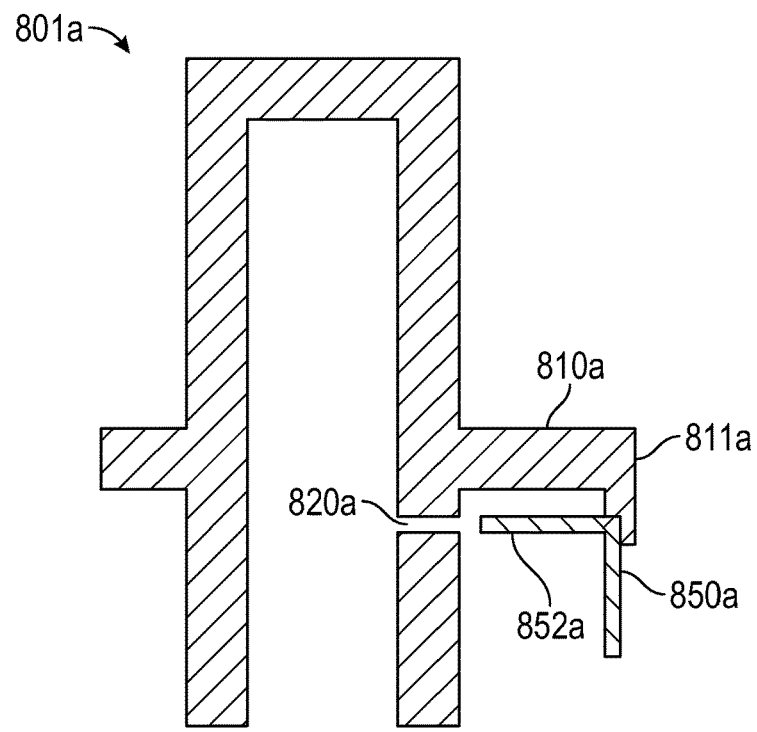
FIG. 8A is a schematic illustration of a process of forming a bleed orifice in an airfoil without a bleed port cavity in accordance with the present disclosure.
Figure 8B:
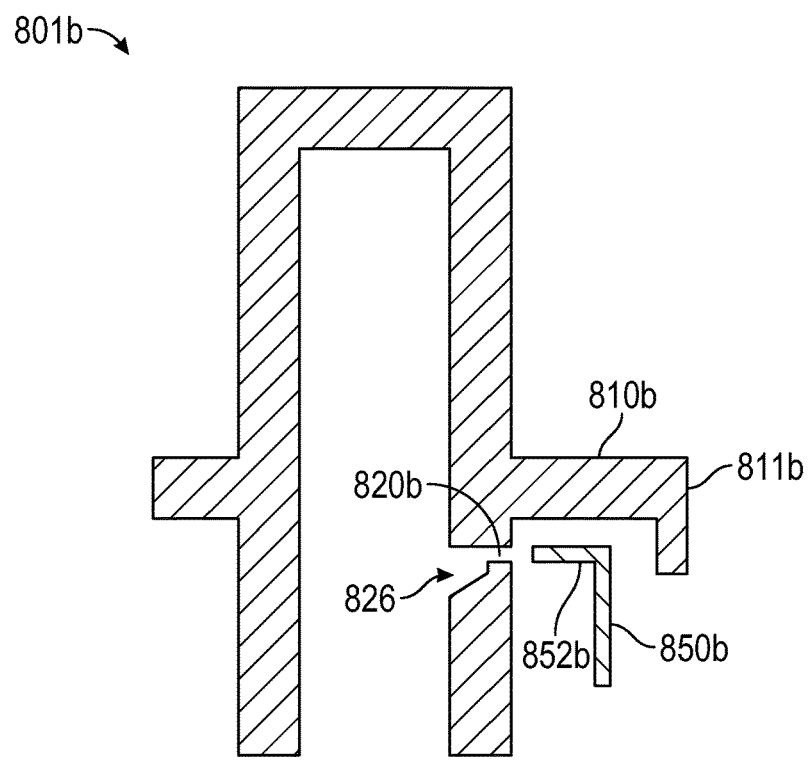
FIG. 8B is a schematic illustration of a process of forming a bleed orifice in an airfoil having a bleed port cavity in accordance with the present disclosure.

Turning now to FIGS. 8A and 8B, example configurations of forming the bleed orifices in airfoils are shown. FIG. 8A shows an airfoil 801a having a platform 810a. The platform 810a may include a rail 811a. The rail 811a may make it difficult to form a bleed orifice 820a in the airfoil 801a below the platform 810a, as described above. For example, as shown, a tool 850a may be used to drill the bleed orifice 820a in the airfoil 801a. The tool 850a may be an electrode used to perform electrical discharge machining on the airfoil to drill through a part thereof. Because of the drilling technique, a tool bit 852a may be required to be about twice the length of the bleed orifice 820a. That is, during the drilling process, the tool bit 852a may degrade and/or melt and so a tool bit 852a that is longer than the bleed orifice 820a is required to form the bleed orifice 820a. However, because of the rail 811a, it may be difficult and/or impossible to drill the bleed orifice 820a, because the rail 811a may prevent a tool bit of appropriate length, as shown by the interference/overlap of the tool 850a and the rail 811a shown in FIG. 8A.

However, if the airfoil is formed with a bleed port as described herein, the length of the bleed orifice 820b may be shortened, and thus a tool 850b may fit within the platform 810b and rail 811b of the airfoil 801b. For example, as shown in FIG. 8B, the bleed orifice 820b is much shorter than the bleed orifice 820a of FIG. 8A due to the inclusion of the bleed port cavity 826 on the interior of the airfoil 801b. Because the bleed orifice 820b is shorter, the tool bit 852b of the tool 850b may be much shorter and thus fit within the area below the platform 810b and the rail 811b will not interfere with the formation of the bleed orifice.

Figure 9:
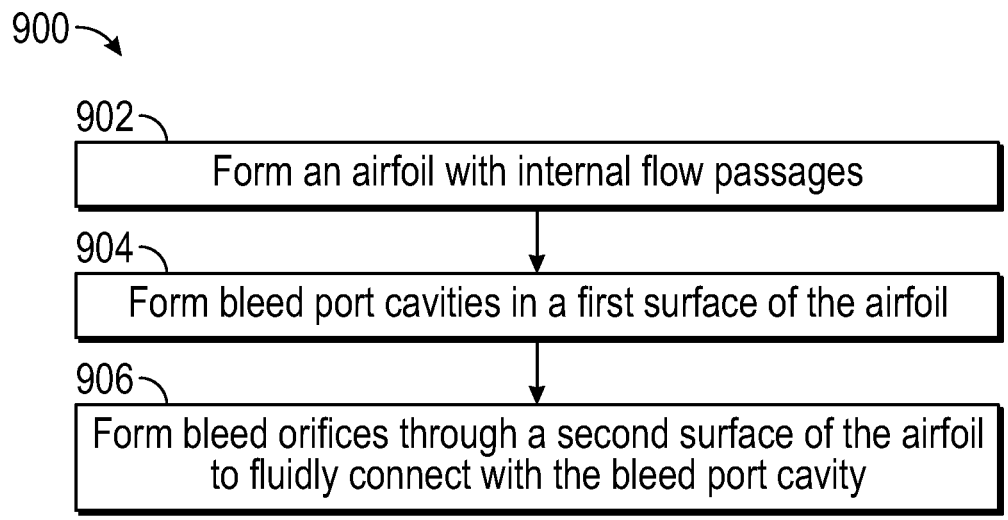
FIG. 9 is a flow process of forming an airfoil for a gas turbine engine in accordance with an embodiment of the present disclosure.

Turning now to FIG. 9, a flow process 900 for manufacturing an airfoil in accordance with a non-limiting embodiment of the present disclosure is shown. At block 902, an airfoil may be formed with internal flow passages, with interior surfaces of the airfoil defining the internal flow passages. At block 904, bleed port cavities may be formed in the interior surfaces of the airfoil. At block 906, bleed orifices may be formed that provided fluid communication from the bleed port cavities to another area, e.g., another internal flow passage or an area external to the airfoil. That is, the formation of the bleed orifices may enable fluid flow from an internal flow passage to another area. As will be appreciated by those of skill in the art, the steps of the flow process 900 may be performed simultaneously and/or nearly simultaneously, or as separate discrete steps. For example, blocks 902 and 904 may be performed simultaneously in a casting or molding process, and block 906 may be performed after blocks 902 and 904.

Advantageously, embodiments described herein provide bleed ports in airfoil that enable bleeding flow from a passage with low or minimized pressure losses. For example, advantageously, traditional high bleed angles (e.g., 90-degree or right turns) in airflow bleeding from an airflow passage may be eliminated. Further, advantageously, in instances where surrounding geometry in an airfoil may prevent bleed orifices being installed at shallow angles, embodiments provided herein enable bleed orifices to be formed in the same locations, without the orifice being angled. Similarly, in some configurations, tight spaces may prevent drilling a long bleed orifice, but embodiments described herein enable such orifices to be formed in tight spaces. For example, an orifice, as described herein, may be formed that is axially parallel with a platform of an airfoil, because the platform prevents an angled orifice formed therein.

Further, advantageously, bleed ports as described herein provide larger bleed port entrances (e.g., wide portion of the bleed port cavity) that enable slowing of the airflow while the air turns from an airflow passage into a bleed orifice. Advantageously, such slowing may result in lower pressure losses compared to other configurations. Moreover, walls of a bleed port cavity may act as scoops or other airflow directors to capture air and cause total pressure recovery.

Further, because the cooling air may make a less than 90-degree turn, this may result in feed pressure between total and static as well as low pressure losses getting onboard the bleed orifice. Furthermore, advantageously, the shorter bleed orifice as enabled herein may result in less friction loss as the air enters, passes through, and exits the bleed orifice. Moreover, advantageously, various geometries of the walls of the bleed port cavities described herein may allow the rotational pull load of the airfoil body to go around the bleed port, which may result in a smoother stress field (i.e., lower stresses) within the materials around the bleed port. Furthermore, as described herein, smaller or shorter tools may be used to form the bleed orifices, thus enabling formation of bleed orifices in locations not previously available.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, although shown and described herein with respect to vanes and blades, those of skill in the art will appreciate that any type of airfoil or component requiring flow passages and bleed ports may employ embodiments described herein. For example, although described with respect to airfoils of gas turbine engines, those of skill in the art will appreciate that the airfoils are not limited to gas turbine engines, and embodiments described herein may be applied to any type of airfoil that has internal cooling passages. Further, although described and shown with various example geometries and configurations, those of skill in the art will appreciate that variations on the disclosed shapes, geometries, etc. may be made without departing from the scope of the present disclosure. Moreover, although an aero or aircraft engine application is shown and described above, those of skill in the art will appreciate that airfoil configurations as described herein may be applied to industrial applications and/or industrial gas turbine engines, land based or otherwise.

Accordingly, the present disclosure is not to be seen as limited by the foregoing description, but is only limited by the scope of the appended claims.

What is claimed is:

1. An airfoil of a gas turbine engine comprising:
an airfoil body having a platform, a blade neck transition wall, and at least one internal flow passage, the body having a first surface of the blade neck transition wall and a second surface of the blade neck transition wall, the first surface defining a wall of the at least one internal flow passage; and
a bleed port fluidly connecting the at least one internal flow passage to the second surface, the bleed port comprising:
a bleed orifice extending from the second surface toward the internal flow passage; and
a bleed port cavity extending from the first surface toward the second surface, the bleed port cavity and the bleed orifice fluidly connected, the bleed port cavity defined by:
a bleed port cavity wall; and
a base wall surrounding the bleed orifice, wherein the bleed port cavity wall extends from the first surface to the base wall,
wherein the bleed port cavity is defined having a wide end formed within the first surface and a narrow end fluidly connected to the bleed orifice, wherein the narrow end of the bleed port cavity is larger than the bleed orifice.

2. The airfoil of claim 1, wherein the second surface is one of a surface of a second internal flow passage and a surface external to the airfoil.

3. The airfoil of claim 1, further comprising a second bleed orifice extending from the second surface to the base wall of the bleed port cavity.

4. The airfoil of claim 1, wherein the bleed port is a first bleed port, the airfoil further comprising a second bleed port.

5. The airfoil of claim 4, wherein the second bleed port comprises:
a second bleed orifice extending from the second surface toward the internal flow passage at a location different from the first bleed port; and
a second bleed port cavity extending from the first surface toward the second surface, the second bleed port cavity and the second bleed orifice fluidly connected, the second bleed port cavity defined by:
a second bleed port cavity wall; and
a second base wall surrounding the second bleed orifice,
wherein the second bleed port cavity wall extends from the first surface to the second base wall.

6. The airfoil of claim 1, wherein the bleed port cavity wall comprises:
an upstream cavity wall located upstream of the bleed orifice in an airflow direction within the internal flow passage, the upstream cavity wall angled in the airflow direction; and
a downstream cavity wall located downstream of the bleed orifice in the airflow direction, the downstream cavity wall oriented to be skew with respect to a direction of the bleed orifice.

7. The airfoil of claim 6, wherein the downstream cavity wall extends in a direction substantially similar to the angle of the upstream cavity wall.

8. The airfoil of claim 6, wherein the downstream cavity wall extends in a direction substantially opposite to the angle of the upstream cavity wall.

9. The airfoil of claim 1, wherein the bleed port cavity wall is arranged as a curved surface extending from the first surface of the airfoil to the base wall.

10. The airfoil of claim 1, wherein the bleed port cavity wall is arranged as a multi-faceted, planar geometry.

11. A method of manufacturing an airfoil of a gas turbine engine comprising:
forming an airfoil body with a blade neck transition wall, a platform and at least one internal flow passage, the body having a first surface of the blade neck transition wall and a second surface of the blade neck transition wall, the first surface defining a wall of the at least one internal flow passage; and
forming a bleed port in the airfoil body, the bleed port fluidly connecting the at least one internal flow passage to the second surface, the bleed port comprising:
a bleed orifice extending from the second surface toward the internal flow passage; and
a bleed port cavity extending from the first surface toward the second surface, the bleed port cavity and the bleed orifice fluidly connected, the bleed port cavity defined by:
a bleed port cavity wall; and
a base wall surrounding the bleed orifice,
wherein the bleed port cavity wall extends from the first surface to the base wall,
wherein the bleed port cavity is defined having a wide end formed within the first surface and a narrow end fluidly connected to the bleed orifice, wherein the narrow end of the bleed port cavity is larger than the bleed orifice.

12. The method of claim 11, wherein the bleed port is formed between two separate airflow passages within the airfoil.

13. The method of claim 11, wherein the bleed port is formed between the internal flow passage and an exterior surface of the airfoil.

14. The method of claim 11, further comprising forming a second bleed orifice extending from the second surface to the base wall of the bleed port cavity.

15. The method of claim 11, wherein the bleed port is a first bleed port, the method further comprising forming a second bleed port in the airfoil.

16. The method of claim 15, wherein the second bleed port comprises:
a second bleed orifice extending from the second surface toward the internal flow passage at a location different from the first bleed port; and
a second bleed port cavity extending from the first surface toward the second surface, the second bleed port cavity and the second bleed orifice fluidly connected, the second bleed port cavity defined by:
a second bleed port cavity wall; and
a second base wall surrounding the second bleed orifice,
wherein the second bleed port cavity wall extends from the first surface to the second base wall.

17. The method of claim 11, wherein the internal airflow passage and the bleed port cavity are formed simultaneously.

18. The method of claim 11, wherein the bleed orifice is formed by electrical discharge machining.

19. A gas turbine engine comprising:
an airfoil having:
an airfoil body with a blade neck transition wall, a platform, and at least one internal flow passage, the body having a first surface of the blade neck transition wall and a second surface of the blade neck transition wall, the first surface defining a wall of the at least one internal flow passage; and
a bleed port fluidly connecting the at least one internal flow passage to the second surface, the bleed port comprising:
a bleed orifice extending from the second surface toward the internal flow passage; and
a bleed port cavity extending from the first surface toward the second surface, the bleed port cavity and the bleed orifice fluidly connected, the bleed port cavity defined by:
a bleed port cavity wall; and
a base wall surrounding the bleed orifice,
wherein the bleed port cavity wall extends from the first surface to the base wall,
wherein the bleed port cavity is defined having a wide end formed within the first surface and a narrow end fluidly connected to the bleed orifice, wherein the narrow end of the bleed port cavity is larger than the bleed orifice.

* * * * *